United States Patent [19]
Horak et al.

[11] 3,780,981
[45] Dec. 25, 1973

[54] AUTOMATIC TANK PLUG VALVE

[76] Inventors: Vladimir Horak, 353 High St., Closter, N.J. 07624; John Vretenar, 9110 Kennedy Blvd., North Bergen, N.J. 07047

[22] Filed: Jan. 24, 1972

[21] Appl. No.: 220,231

[52] U.S. Cl................. 251/144, 251/132, 251/137
[51] Int. Cl........................... F16k 1/38, F16k 31/10
[58] Field of Search.................... 251/144, 205, 129, 251/132, 137, 61.4; 137/576

[56] References Cited
UNITED STATES PATENTS

| | | | |
|---|---|---|---|
| 3,411,745 | 11/1968 | Austin, Jr. et al. | 251/144 X |
| 2,587,538 | 2/1952 | Seaman | 251/132 |
| 3,139,262 | 6/1964 | Morris et al. | 251/205 |
| 2,616,447 | 11/1952 | Williams | 251/137 X |
| 1,523,035 | 1/1925 | Murphy et al. | 251/144 X |
| 2,513,450 | 7/1950 | Carlisle | 137/576 X |
| 2,536,813 | 1/1951 | Jones et al. | 251/132 X |
| 2,727,715 | 12/1955 | Tuthill | 251/144 X |

*Primary Examiner*—William R. Cline
*Attorney*—Edward F. Levy

[57] ABSTRACT

An automatic plug valve is mounted within a tank containing fluid to be dispensed through an outlet opening having a valve seat. The valve includes a valve head having a conical shape which conforms to the frusto-conical shape of the valve seat. A valve stem is connected to the valve head and extends exteriorly of the tank. Automatic actuating means is provided to lift the valve stem and valve head at selected intervals, and manual adjustment means, located exteriorly of the tank, are provided for raising and lowering the valve actuating means to selectively regulate the distance through which the valve head is elevated.

10 Claims, 5 Drawing Figures

AUTOMATIC TANK PLUG VALVE

The present invention relates to metering valves, and in particular relates to an automatic plug valve which is used for dispensing liquids from an enclosed tank.

The valve of the present invention is particularly adapted for use in storage and mixing tanks wherein liquids are to be dispensed in measured or metered quantities automatically. In some applications, strong chemicals are dispensed for mixing with a chemical composition, and when these dispersed chemicals are corrosive, problems are encountered in the contstruction and operation of the valves. Conventionally, in reactors or other vessels used in chemical productions, valves are placed within the outlet pipe and are controlled either by hand or automatically by external forces such as electricity, hydraulic power, vacuum or the like. Such valve installations are expensive, difficult to control accurately, and subject to breakage and failure when operated continuously over long periods.

It is the object of the present invention to provide an outlet control metering valve of the plug type which is installed within an enclosed vessel and is operated by automatic control mechanism located outside the vessel.

Another object of the invention is the provision of a valve of the character described which includes a conical valve head cooperating with a correspondingly shaped tapered valve seat, and capable of being lifted from the seat to provide an annular outlet orifice for the dispensing of liquids. Means are provided for adjusting the opening of the valve to provide precise and accurate selective flow of liquid through the valve, the valve being capable of being micro-metrically adjusted to produce an outlet flow ranging from dripping to a full rate of flow determined by the diameter of the outlet and the height of the liquid.

Still another object of the invention is the provision of a valve of the character described which may be automatically opened and closed at selected intervals by electrical, hydraulic, or vacuum forces or the like in such a manner that the response time is substantially instantaneous and may be measured in milliseconds.

A further object of the invention is the provision of a valve of the character described in which means are provided for manually opening and closing the valve in case of failure of the automatic control means, and in which adjustment of the orifice is maintained even where manual operation is employed.

A further object of the invention is the provision of a valve of the character discribed in which the operating valve parts may be made of corrosive-resistant materials, and which may be manufactured and installed economically when compared with conventional solenoid valves conventionally employed for dispensing corrosive liquids.

In accordance with the invention herein, there is provided for use in a tank containing liquids and having an outlet opening, an automatic valve comprising a valve head located within the tank and having a conical outer surface, a valve seat bordering the valve outlet opening, a valve stem carrying the valve head and extending through the tank to the exterior thereof, and spring means biasing the valve stem longitudinally to a valve-closed position in which the valve head is seated in the valve seat. Valve actuating means, which may be in the nature of one or more solenoids, is provided exteriorly of the tank and is coupled to the valve stem. When the valve-actuating means is operated, it moves the valve stem longitudinally to a valve-open position in which the conical surface of the valve head is spaced from the frusto-conical surface of the valve seat to provide an annular outlet orifice. Means are provided for selectively adjusting the position of the valve actuating means to selectively vary the size of the annular outlet orifice. Such adjusting means may constitute a micrometer adjustment. Manual means may also be provided for lifting the valve head to its adjusted valve-open position in case of failure of the valve actuating means.

Additional objects and advantages of the invention will become apparent during the course of the following specification when taken in connection with the accompanying drawings, in which.

Figure 1:
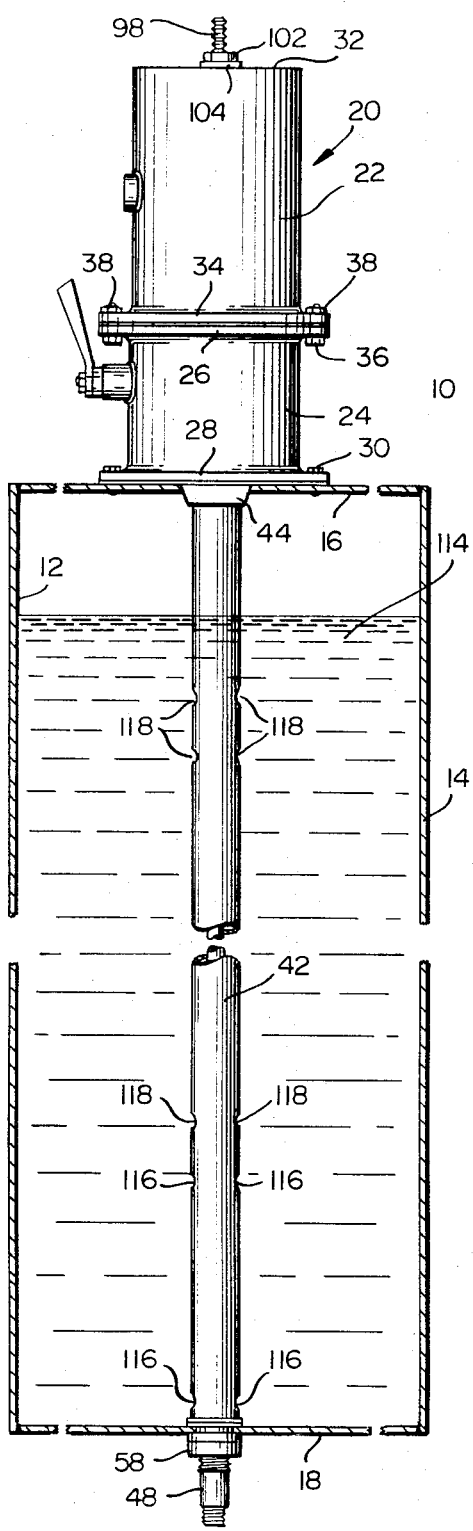
FIG. 1 is a side elevational view of a tank having the valve assembly of the instant invention mounted therein, the front wall of the tank being broken away and shown in section to disclose the valve therein.

Referring in detail to the drawings, there is shown in FIG. 1 a storage tank 10 incorporating the plug valve assembly of the present invention. The tank 10 is completely enclosed, having side walls 12, 14, a top wall 16 and a bottom wall 18.

Mounted on the tank top wall 16 is a cylindrical housing 20 which encloses the actuating means for the valve to be described hereinafter. The housing 20 is formed of two separate housing sections, namely an upper section 22 and a lower section 24. The lower housing section 24 has an open top end bordered by an annular flange 26 and an open bottom end bordered by an annular flange 28, the latter resting flush upon the top surface of the tank top wall 16 and being secured thereto, as by bolts 30. The upper housing section 22 has a top wall 32 and an open bottom end bordered by an annular flange 34. In the assembled housing 20, the flange 34 overlies and registers with the flange 26, and is secured tightly thereto by bolts 36 and nuts 38.

In its mounted position on the tank 10, the housing 20 is centered upon a circular opening 40 in the tank top wall 16, through which extends the upper end portion of a tube 42. An annular gasket 44 disposed within the opening 40, surrounds the upper portion of tube 42 and provides a fluid-tight seal thereabout.

Figure 2:
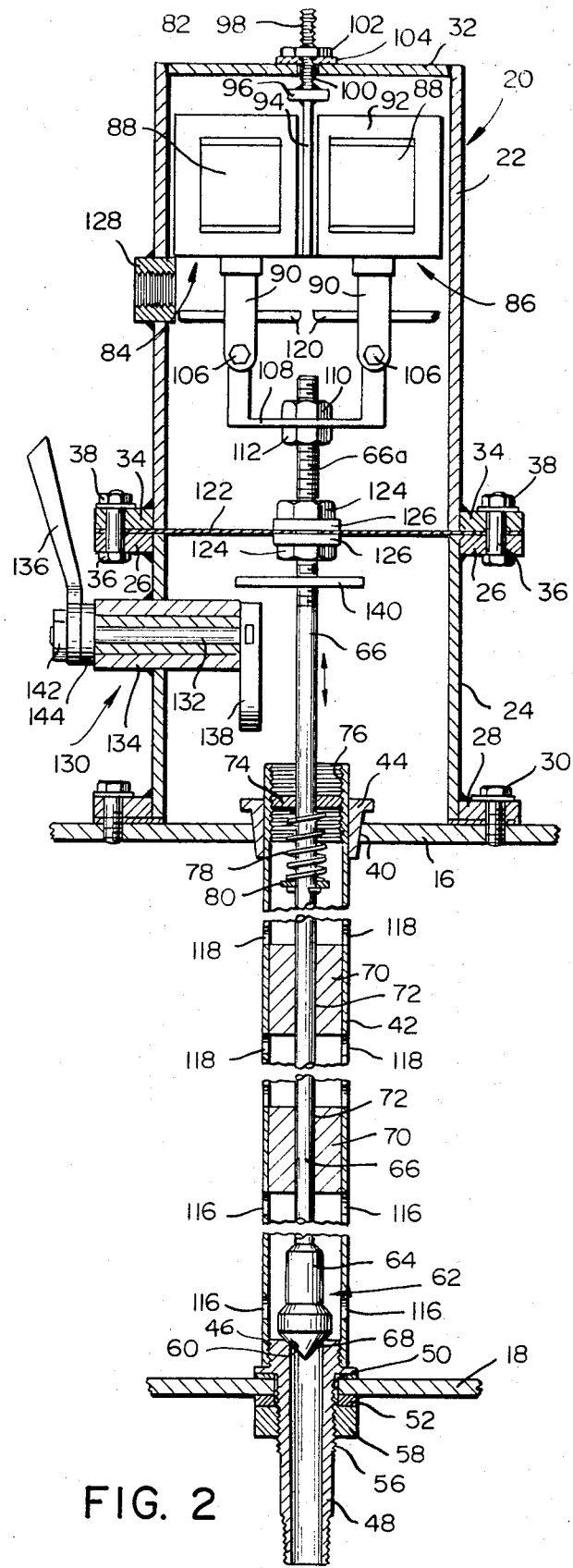
FIG. 2 is an enlarged vertical section showing the structure of the valve assembly of FIG. 1, the valve head being shown in closed position.
Figure 4:
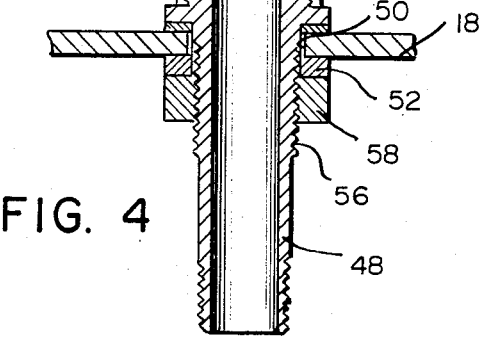
FIG. 4 is an enlarged sectional view of the valve portion located within the tank, showing the valve head in a fully open adjusted position.

The tube 42 extends vertically through the interior of the tank 10, and its lower end is internally threaded, as shown at 46 in FIGS. 2 and 4, to receive a hollow outlet fitting 48 which projects through an aperture 50 in tank bottom wall 18. A resilient gasket 52 borders the aperture 50 and underlies a peripheral flange 54 on fitting 48 to provide a fluid tight seal about said fitting. The fitting 48 is also provided with external threading 56 upon which a nut 58 is turned into firm engagement with the lower surface of gasket 52 thereby securely mounting the tube 42 and fitting 48 on tank bottom wall 18 and also improving the aforementioned sealing action of gasket 52.

The top surface of the fitting 38, which projects upwardly into the interior of tube 42, is formed with a tapered, frusto-conical surface 60 providing a valve seat, best seen in FIG. 4. Cooperating with this valve seat 60 is a valve head 62 having an upper portion 64 attached to a valve stem 66 by threading (not shown) or similar means, and a lower portion 68 of conical shape.

The valve stem 66 extends through the interior of tube 42 and projects upwardly an appreciable distance beyond the top end of said tube, into the interior of housing 20. Mounted within the interior of tube 42 are a plurality of guide plugs 70, each having a central bore 72 through which the valve stem 66 extends slidably with a close precision fit. The valve stem also extends slidably through the central aperture of a guide plate 74 which is externally threaded for mounting on internal threading 76 at the upper end of tube 42. The guide plugs 70 and guide plate 74 maintain the valve stem 66 centered within the tube 42 and guide said valve stem for accurate vertical movement within said tube, thereby guiding the valve head 62 accurately in its movements between its seated and open positions, as will be presently described.

A coiled compression spring 78 is interposed between the guide plate 74 and a flange 80 secured to the valve stem 66. The spring 78 surrounds said valve stem and applies spring tension against the flange 80, thereby urging the valve head 62 into seated position within the valve seat 60, as shown in FIG. 2.

Automatic valve-actuating means 82 is provided within the interior of housing 20 for automatically lifting the valve head 62 from its seated position to a selected open or metering position. Such valve-actuating means may be operable by any suitable force such as hydraulic or pneumatic forces, for example, but is shown herein by way of illustration as including electrically energized solenoids 84 and 86. Each solenoid includes a coil or electromagnet 88 and a plunger 90 which is drawn upwardly when the associated coil or electromagnet is energized.

The solenoids 84 and 86 are mounted side-by-side in a block 92 which extends through an aperture in a narrow plate 94, and are secured to said plate. The plate 94 is secured to a bar 96 to which a threaded screw shank 98 is secured in upstanding position. The screw shank 98 extends through an aperture 100 in the top wall 32 of housing 20, and an adjustment nut 102 is mounted on the screw shank 98 outside housing 20, with a washer 104 preferably inserted between the nut 102 and housing top wall 32. It will be apparent that manual turning of the adjustment nut 102 upon the screw shank 98 will selectively raise or lower the plate 94 and the solenoids carried thereby.

The plungers 90 extend downwardly from the respective solenoids 84 and 86 and at their ends are connected by bolts 106 to the arms of a U-shaped bracket 108. The valve stem 66 has a threaded upper end portion 66a which extends through an aperture in the bracket 108 and is secured to said bracket by a pair of nuts 110 and 112.

The coils 88 of solenoids 84 and 86 are connected in parallel through suitable switch or timer means (not shown) to a source of electrical current so that the solenoid coils are energized simultaneously to raise both plungers 90 in unison. While a single solenoid coil and plunger may be effectively employed for raising the valve stem 66, it is preferred to include the two solenoids 84 and 86 wired in parallel, to insure that one of the solenoids will operate in the event that the other solenoid becomes damaged or inoperative.

The storage tank 10 is adapted to contain a supply of liquid 114, as shown in FIG. 1. To permit such liquid to flow freely to the valve, the tub 42 is provided with a plurality of openings 116, adjacent the lower and thereof. THe liquid in tank 10 can thus flow through openings 116 into the lower portion of tube 42 beneath the lowermost guide plug 70, so as to be released through outlet fitting 48 when the valve head 62 is lifted from valve seat 60. Additional openings 118 may be provided in tube 42 above the guide plugs 70 to equalize the pressure inside and outside of said tube.

As previously indicated, the valve head 62 is normally held by spring 78 in the valve-closed position of FIG. 2 in which its conical lower portion 68 is seated within valve seat 60. The tapered surface of valve seat 60 is formed with the same angle of inclination as the conical end section 68 of valve head 62 so that a precise fit is effected therebetween, and no liquid can flow through the outlet fitting 48. When the solenoid coils or electromagnets 88 are energized, the plungers 90 are drawn upwardly thereby, lifting valve stem 66 through bracket 108, and thereby lifting the valve head 62 in a precise vertical movement from the valve seat 60. Stop members 120 may be mounted on the plungers 90 to limit the extent of upward movement thereof.

A flexible seal may be provided between the valve actuating means 82 and the portions of the valve within tube 42, by means of a diaphragm 122 preferably formed of a sheet of plastic material, such as Teflon, which is impervious to any corrosive liquids contained within tank 14. The sheet is preferably about one ten-thousands of an inch in thickness so that it has considerable flexibility, and is circular in shape with a diameter larger than the inner diameter of the cylindrical housing 20. As shown in FIG. 2, the outer circumferential margin of the diaphragm 122 is clamped tightly between the flanges 26 and 34 of the upper and lower housing sections 22 and 24. The valve stem upper portion 66a extends through the center of the diaphragm 122 and is secured thereto by a pair of nuts 124 which are tightened upon a pair of resilient washers 126 which clamp the central portion of the diaphragm therebetween. Because of the resiliency of the diaphragm 122, when the valve stem is raised and the central portion of the diaphragm is elevated thereby, the diaphragm flexes upwardly to permit lifting of the valve stem, at the same time maintaining the seal between the upper and lower housing sections.

An important feature of the invention is the ability to adjust the lifting movement of the valve head 62 so as to selectively control the flow rate of the liquid through the valve when the latter is opened. This adjustment may be easily accomplished from the exterior of the housing 20 by selectively turning the nut 102 in a direction to raise or lower the valve actuating means 82. FIG. 2 shows the solenoids 84, 86 at an adjusted setting at which, when energized, the valve head 62 is lifted to a maximum open position shown in FIG. 4, thereby effecting a full flow of liquid through the outlet fitting 48. To decrease the flow of liquid, the adjustment screw 102 is turned in a direction to lower the solenoid coils 84, 86 relative to the plungers 90. When the solenoids are now energized, the plungers are drawn upwardly to a lesser extent than formerly, and the valve head 62 is raised from the valve seat 60 to a lesser extent, such adjusted open position being shown, for example, in FIG. 5.

Figure 5:
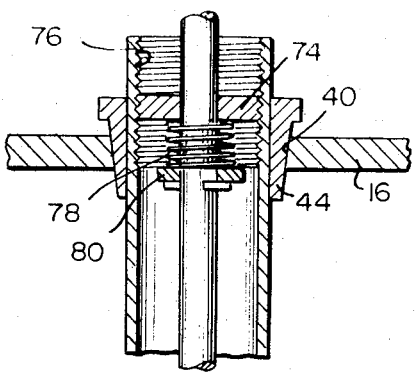
FIG. 5 is a partial sectional view of the valve head and valve seat portion of the valve as shown in FIG. 4, but showing the valve head in an adjusted open position providing a small outlet orifice.
Figure 5:
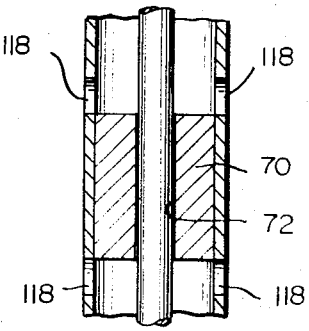
Figure 5:
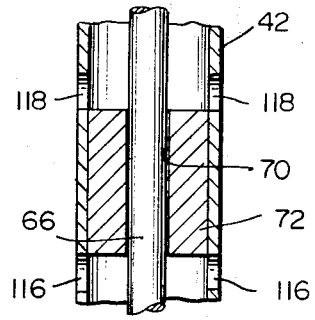
Figure 5:
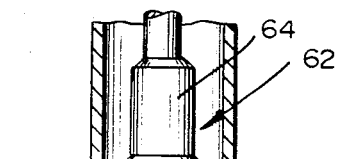
Figure 5:
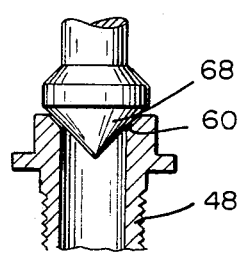

Because of the conical shape of the valve head portion 68 and the complementary shape of the valve seat 60, an annular outlet orifice is formed between the outer surfaces of the valve seat 60 and the valve head portion 68. The width of this annular outlet orifice can be selectively adjusted, in the manner described above, from an extremely narrow width, such as shown in FIG. 5, wherein the liquid emerges from the outlet fitting 48 in regulated drops, to a large width, as shown in FIG. 4, wherein a full flow of liquid through the outlet fitting is achieved.

The valve assembly shown herein is particularly adpated for use in conjunction with mixing tanks, reactors and other vessels wherein measured amounts of chemical or other liquids are automatically metered. For this purpose, timer devices or other automatic control mechanism may be easily and affectively coupled with the valve mechanism for actuating the valve control means 82 at selected intervals. The housing 20 is provided with an outlet fitting 128 through which the lead wires (not shown) of the solenoids 84 and 86 pass to the exterior of the housing. These wires may be attached to a timer or other control device mounted on the housing 20 or situated at a remote location. With accurate adjustment of the valve head opening distance, the valve may thus be opened and closed automatically at selected intervals to dispense an ascurately metered amount of liquid, with the valve response achieved in milliseconds. In addition, the ratio between the height of the liquid level (and thus pressure) within the tank 14 and the size of the valve annular outlet orifice can be controlled automatically so that a constant flow rate is achievable. Thus, if a servo-mechanism is employed for lifting or lowering the solenoid coils 88, a very accurate relation can be achieved between the liquid pressure and the flow rate, so that the valve assembly may be used as a flow-rate regulator.

In the event that the automatic control system, including the solenoids 84 and 86, should cease to operate because of a power failure, damage, or any other reason, manual valve actuating means 130 is also provided. Such manual actuating means 130 is illustrated in FIG. 2 as including a shaft 132 journalled in a bushing 134 which extends through the wall of housing 20. A handle 136 is mounted on one end of the shaft 132 outside of said housing, and a circular disc 138 is mounted eccentrically on the other end of said shaft 132.

When the handle 136 is turned, the offset disc 138 is correspondingly turned, and the latter engages a plate 140 affixed to the threaded upper portion 66a of valve stem 66. The disc 138 acts as a cam for elevating the valve stem and valve head 62 to the same height as would be effected by the adjusted automatic valve actuating means 82. The handle 136 is mounted on the shaft 132 by a nut 142 and washer 144 which may be tightened to provide a sufficient frictional binding force to maintain the disc 138 in manually turned position, thereby releasing the operator from the necessity of holding the manual valve actuating means 130 in its valve-opening position.

Figure 3:
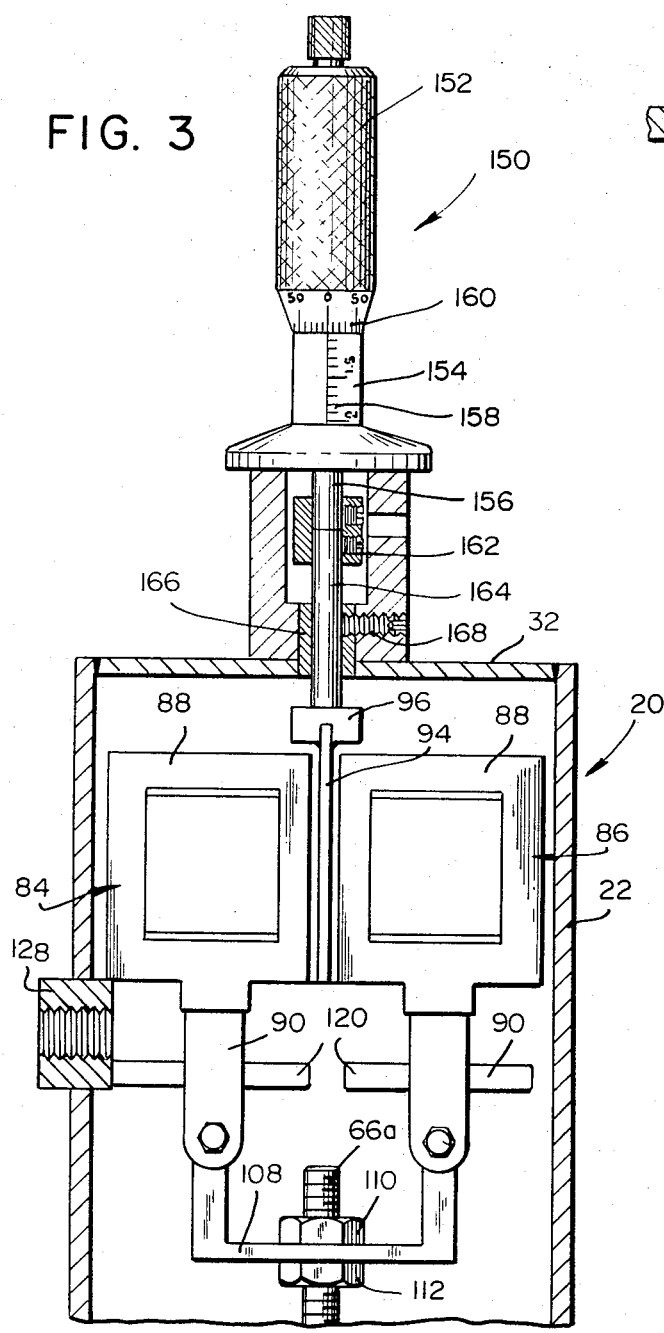
FIG. 3 is a sectional view of the upper portion of the valve assembly, showing an alternate micrometer structure for adjusting the size of the valve outlet orifice.

FIG. 3 shows an alternate structure, in the nature of a micrometer 150 which may be used to replace the adjustment nut 102 for the purpose of raising and lowering the valve actuating means 86 to selected adjusted positions with a fine degree of precision. The micrometer 150 is mounted on the top wall 32 of the upper housing section 22 and is of the conventional and well-known type including a knurled sleeve 152 which can be manually rotated relative to a collar 154 to raise or lower a rod 156 in fine increments of movement as measured on a distance scale 156 and vernier scale 160. A coupling member 162 clamps the end of rod 156 to a cylindrical pin 164 which extends through a bushing 166 in the top wall 32 and is affixed to the bar 96 supporting the plate 94 which carries the solenoids 84 and 86. A set screw 168 may be used to apply frictional force against the pin 164 and increase the accuracy of adjustment. By use of the scale 158, and particularly the vernier scale 160, when the handle 152 is turned to raise or lower the solenoids, the open position of the valve head, and thus the size of the valve outlet orifice can be selectively regulated with such mathematical precision as to provided an exact metered flow of liquid through the valve.

It will be appreciated that the valve shown herein can be incorporated in any automated system where measured dispensing of liquids is required at selected intervals, and can be controlled by an alarm device in the event of power failure, so that manual actuation can be substituted.

In the event that the valve is employed for dispensing corrosive liquids, the valve head, valve seat, and othe operating parts within the tank 10 may be made of Teflon or other corrosion-resistive material. This permits the valves to be made with relatively large outlet orifices of five or more inches in diameter, which operate with the same accuracy as smaller openings, but can be provided at a much lower cost than similarly-sized valves which presently dispense corrosive liquids.

While preferred embodiments of the invention have been shown and described herein, it is obvious that numerous omissions, changes and additions may be made in such embodiments without departing from the spirit an scope of the invention.

What is claimed is:

1. An automatic valve for use in a tank containing liquids, and having an outlet opening, said valve comprising a valve head located within said tank and having a conical outer surface, a valve seat bordering said outlet opening and having a frusto-conical surface, a valve stem carrying said valve head and extending through said tank to the exterior thereof, spring means biasing said valve stem longitudinally to a valve-closed position in which the valve head is seated in said valve seat, valve actuating means located exteriorly of said tank and connected to said valve stem for moving the latter longitudinally to a valve-open position in which the conical surface of said valve head is spaced from the frusto-conical surface of said valve seat to provide an annular outlet orifice, means for selectively adjusting the position of said valve actuating means and for controlling the spacing of said valve head from said frusto-conical surface in the valve-open position to selectively vary the size of said annular outlet orifice, and a flexible diaphragm connected to and surrounding said valve stem above said tank and providing an air-tight seal between said actuating means and the interior of said tank.

2. A valve according to claim 1 in which said valve stem extends vertically through said tank and projects through the top wall thereof, said valve actuating means being mounted above said top wall and being power driven to raise said stem vertically from said valve seat to the adjusted valve-open position against the biasing force of said spring means.

3. A valve according to claim 2 in which a housing is mounted on the top wall of said tank the projecting protion of said valve stem and said valve actuating means being located within said housing, said adjusting means including a threaded assembly mounting said valve actuating means on said housing and being accessible from the exterior thereof for manual turning movement to selectively raise and lower said valve actuating means.

4. A valve according to claim 3 in which said threaded assembly comprises a micrometer.

5. A valve according to claim 3 in which said valve actuating means includes a solenoid having a plunger connected to said valve stem.

6. A valve according to claim 3 in which said valve actuating means includes a pair of solenoids connected in parallel to an electric power source, each of said solenoids having a plunger connected to said valve stem.

7. A valve according to claim 3 which also includes manual actuating means mounted on said housing and associated with said valve stem for raising the latter to the adjusted valve-open position independently of said valve actuating means.

8. A valve according to claim 7 in which said manual actuating means includes a shaft journalled in said housing, an operating handle affixed to said shaft exteriorly of said housing, a cam mounted on said shaft within said housing, and a projection on said valve stem positioned to be engaged by said cam when said shaft is turned by said handle.

9. A valve according to claim 3 which also includes a tube extending vertically through said tank, the lower end of said tube communicating with and enclosing said valve seat, and the upper end of said tube communicating with an opening in the top wall of said housing, said valve head being located within said tube and said valve stem extending upwardly through said tube, said tube having a plurality of openings therein communicating with the interior of said tank.

10. A valve according to claim 9 in which said tube also contains guide means spaced along the interior of said tube for guiding said valve stem for vertical movement between its valve-open and valve-closed positions.

* * * * *